No. 619,994. Patented Feb. 21, 1899.
J. R. REYNOLDS.
ANIMAL MUZZLE.
(Application filed Mar. 18, 1898.)

(No Model.)

Witnesses
Geo. E. Frech.
B. E. Seitz.

Inventor
J. R. Reynolds
by H. S. Pattison
Attorney

THE NORRIS PETERS CO., PHOTO-LITHO., WASHINGTON, D. C.

UNITED STATES PATENT OFFICE.

JOHN ROBERT REYNOLDS, OF HEALDSBURG, CALIFORNIA.

ANIMAL-MUZZLE.

SPECIFICATION forming part of Letters Patent No. 619,994, dated February 21, 1899.

Application filed March 18, 1898. Serial No. 674,358. (No model.)

*To all whom it may concern:*

Be it known that I, JOHN ROBERT REYNOLDS, of Healdsburg, in the county of Sonoma and State of California, have invented certain new and useful Improvements in Animal-Muzzles; and I do hereby declare the following to be a full, clear, and exact description of the invention, such as will enable others skilled in the art to which it pertains to make and use the same, reference being had to the accompanying drawings, which form part of this specification.

My invention relates to improvements in animal-muzzles, and pertains to a muzzle or pocket adapted to prevent the animal from biting trees, grape-vines, corn, &c., while cultivating the plant.

The object of my invention is to provide a muzzle in which the basket is so constructed as to curve around under the bit and behind the lower jaw of the animal and having only a front connection in the way of a bar or arm running up the face of the animal and adapted to hook over the brow-band, whereby the muzzle cannot become detached from the animal's mouth without unhooking or detaching the upper end of the said arm, and yet permit the ready attachment and detachment of the muzzle from the animal with the bridle in position upon its head, and also to construct the muzzle of a single piece of wire having its lower end bent into a loop curved around under the bit and behind the mouth of the animal and extended upward and forming the attaching-arm and a woven-wire basket attached to the curved and bent portion of the wire.

Figure 1:
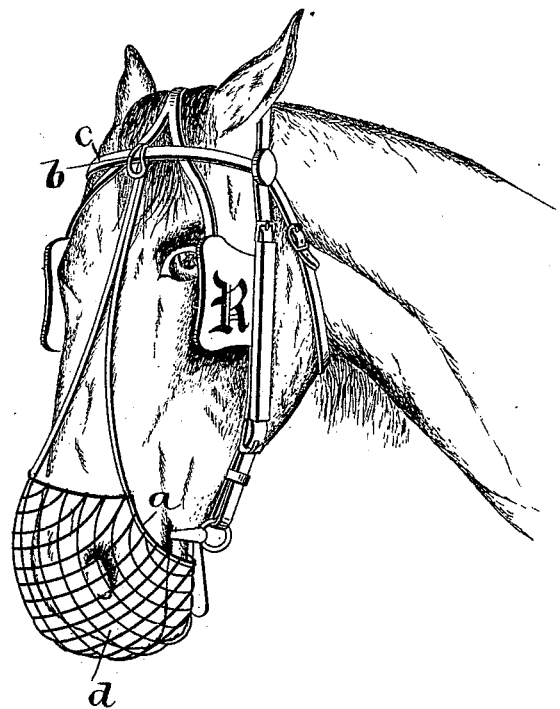
Figure 2:
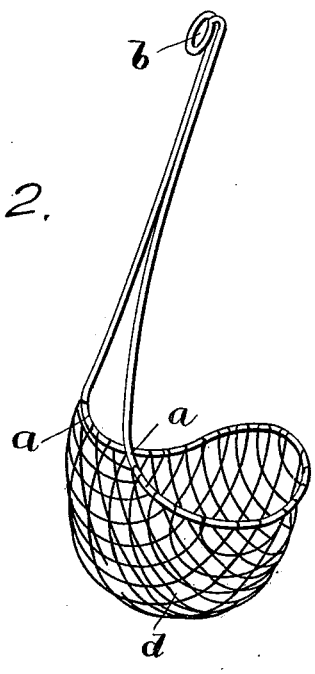

Referring now to the drawings, Figure 1 is a side elevation of an animal's head, showing my invention in position thereon. Fig. 2 is an enlarged detached perspective view.

As fully shown, the muzzle preferably consists of a wire frame having its lower portion *a* passing at each side of the animal's mouth and curved upward in rear of its chin, the forward end of the wire extending upward and provided with a hook *b*. This hook preferably turns upward, though it may be turned in the opposite direction. The hook is caught over the brow-strap *c* of the bridle.

I preferably form the basket portion *d* of wire, though it may be formed of any material which will allow the passage of air for the animal to breathe.

While I show and describe the frame consisting of wire and extending upward into a handle or arm, it will be readily understood that this may be varied and a flat piece substituted for the upwardly-extending wire without departing from the spirit and scope of my claims, which is a pocket or muzzle adapted to receive the mouth of the animal and having an upwardly-extending arm or handle constructed to be attached to the brow-band of the bridle.

From the above description and illustration it will be noted that the basket or muzzle curves under the bit of the bridle around behind and inclosing the rear jaw of the animal, whereby the single attachment at the front of the muzzle to the brow-band of the bridle holds the muzzle firmly in position and will prevent the animal from detaching the same without the upper end of the supporting-arm being first detached from the brow-band of the halter.

I am aware that muzzles have been provided which can be attached to the animal with the bridle thereon; but in this instance the muzzle has been of a different specific shape and has required several points of attachment to the bridle and to the other parts of the harness. My invention differs, essentially, from this in having the muzzle so constructed that a single point of attachment extending up the face of the animal and connected with the brow-band of the bridle will hold the muzzle in position and by means of which it is quickly and readily attached and detached from the bridle.

Having thus described my invention, what I claim, and desire to secure by Letters Patent, is—

1. A muzzle comprising a basket having its upper edge curved around behind and inclosing the rear jaw of the animal, and an arm extending up the face of the animal from the front of the muzzle, and adapted to have its upper end attached to the brow-band of the bridle, whereby the single attachment will hold the muzzle in place and prevent the animal from detaching it, substantially as described.

2. A muzzle composed of a single piece of wire having its lower portion doubled into a loop which incloses the rear jaw of the animal, the wire then extended up the face of the animal and having a means of attachment at its upper end for connecting it to the bridle, and a depending basket attached to the lower curved and looped portion of the wire to inclose the mouth of the animal, substantially as described.

3. A muzzle consisting of a frame curved down under the bit of the bridle around under and inclosing the rear jaw of the animal and having at its front portion an upwardly-extending arm with an outturned hook adapted to catch over the brow-band of the bridle, and a depending basket attached to the doubled portion of the frame, whereby a single point of attachment will hold the muzzle in place against detachment by the animal, substantially as described.

In testimony whereof I affix my signature in presence of two witnesses.

JOHN ROBERT REYNOLDS.

Witnesses:
ANDREW J. GALLAWAY,
ANDREW PRICE.